(12) United States Patent
Nelson et al.

(10) Patent No.: US 11,173,825 B2
(45) Date of Patent: Nov. 16, 2021

(54) CARRIAGE ROLLER FOR REFUSE VEHICLE

(71) Applicant: Oshkosh Corporation, Oshkosh, WI (US)

(72) Inventors: Joseph D. Nelson, Oshkosh, WI (US); John Kuphal, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

(21) Appl. No.: 16/789,014

(22) Filed: Feb. 12, 2020

(65) Prior Publication Data

US 2020/0262328 A1 Aug. 20, 2020

Related U.S. Application Data

(60) Provisional application No. 62/805,799, filed on Feb. 14, 2019.

(51) Int. Cl.
| | |
|---|---|
| *B60P 1/48* | (2006.01) |
| *B60P 1/52* | (2006.01) |
| *B65G 39/02* | (2006.01) |
| *B65F 3/02* | (2006.01) |
| *B65G 65/23* | (2006.01) |

(52) U.S. Cl.
CPC .............. *B60P 1/48* (2013.01); *B60P 1/52* (2013.01); *B65F 3/02* (2013.01); *B65G 39/02* (2013.01); *B65G 65/23* (2013.01); *B65F 2003/023* (2013.01); *B65F 2003/0269* (2013.01); *B65G 2207/48* (2013.01)

(58) Field of Classification Search
CPC .............. B65F 3/04; B60P 1/48; B65G 39/02

USPC ........................................... 414/409; 384/418
See application file for complete search history.

(56) References Cited

U.S. PATENT DOCUMENTS

| | | | | | |
|---|---|---|---|---|---|
| 3,853,315 | A | * | 12/1974 | Dahlgren ................ | B41F 13/36 |
| | | | | | 271/204 |
| 3,966,067 | A | * | 6/1976 | Reese ................... | B60T 11/103 |
| | | | | | 414/409 |
| 4,090,626 | A | * | 5/1978 | Ebeling .................... | B65F 3/08 |
| | | | | | 414/407 |
| 4,219,298 | A | * | 8/1980 | Stragier ................... | B65F 3/08 |
| | | | | | 414/409 |
| 4,664,243 | A | * | 5/1987 | Martin ................... | B65G 39/09 |
| | | | | | 193/37 |
| 4,669,940 | A | * | 6/1987 | Englehardt .............. | B65F 3/08 |
| | | | | | 294/106 |

(Continued)

*Primary Examiner* — Jonathan Snelting
(74) *Attorney, Agent, or Firm* — Foley & Lardner LLP

(57) ABSTRACT

A refuse vehicle includes a chassis, a plurality of tractive elements coupled to the chassis, and a lift assembly including a carriage, a grabber arm selectively repositionable between an engaged position and a disengaged position, a track configured to be coupled to a chassis of the refuse vehicle, and a roller assembly slidably coupling the carriage to the track. In the engaged position, the grabber arm is configured to couple a refuse container to the carriage. The track defines a track groove extending at least partway along a length of the track. The roller assembly includes a base coupled to the carriage, a shaft coupled to the base and extending outward from the base, a roller extending at least partially into the track groove, the roller defining first a central aperture that receives the shaft, and a bushing that rotatably couples the roller to the shaft.

18 Claims, 8 Drawing Sheets

(56) References Cited

U.S. PATENT DOCUMENTS

| | | | |
|---|---|---|---|
| 5,393,180 A * | 2/1995 | Van Den Aarsen | B65F 3/08 414/406 |
| 5,702,225 A * | 12/1997 | Ghibaudo | B65F 3/08 414/408 |
| 5,919,027 A | 7/1999 | Christenson | |
| 5,934,858 A | 8/1999 | Christenson | |
| 5,934,867 A | 8/1999 | Christenson | |
| 5,938,394 A | 8/1999 | Christenson | |
| 5,951,235 A | 9/1999 | Young et al. | |
| 5,967,731 A | 10/1999 | Brandt | |
| 5,984,609 A | 11/1999 | Bartlett | |
| 6,033,176 A | 3/2000 | Bartlett | |
| 6,062,803 A | 5/2000 | Christenson | |
| 6,071,058 A * | 6/2000 | Tetz | B65F 3/08 414/409 |
| 6,089,813 A | 7/2000 | McNeilus et al. | |
| 6,120,235 A | 9/2000 | Humphries et al. | |
| 6,123,500 A | 9/2000 | McNeilus et al. | |
| 6,210,094 B1 | 4/2001 | McNeilus et al. | |
| 6,213,706 B1 | 4/2001 | Christenson | |
| 6,224,318 B1 | 5/2001 | McNeilus et al. | |
| 6,315,515 B1 | 11/2001 | Young et al. | |
| 6,336,783 B1 | 1/2002 | Young et al. | |
| 6,350,098 B1 | 2/2002 | Christenson et al. | |
| 6,447,239 B2 | 9/2002 | Young et al. | |
| 6,474,928 B1 | 11/2002 | Christenson | |
| 6,494,665 B1 * | 12/2002 | Bingman | B65F 3/08 414/409 |
| 6,565,305 B2 | 5/2003 | Schrafel | |
| 7,070,382 B2 | 7/2006 | Pruteanu et al. | |
| 7,284,943 B2 | 10/2007 | Pruteanu et al. | |
| 7,556,468 B2 | 7/2009 | Grata | |
| 7,559,735 B2 | 7/2009 | Pruteanu et al. | |
| 7,878,750 B2 | 2/2011 | Zhou et al. | |
| 8,182,194 B2 | 5/2012 | Pruteanu et al. | |
| 8,215,892 B2 | 7/2012 | Calliari | |
| 8,360,706 B2 | 1/2013 | Addleman et al. | |
| 8,540,475 B2 | 9/2013 | Kuriakose et al. | |
| 8,807,613 B2 | 8/2014 | Howell et al. | |
| 9,216,856 B2 | 12/2015 | Howell et al. | |
| 9,387,985 B2 | 7/2016 | Gillmore et al. | |
| 9,694,776 B2 | 7/2017 | Nelson et al. | |
| 9,880,581 B2 | 1/2018 | Kuriakose et al. | |
| 9,981,803 B2 | 5/2018 | Davis et al. | |
| 10,196,205 B2 | 2/2019 | Betz et al. | |
| 10,286,239 B2 | 5/2019 | Shively et al. | |
| 10,457,533 B2 | 10/2019 | Puszkiewicz et al. | |
| 10,558,234 B2 | 2/2020 | Kuriakose et al. | |
| 2017/0341860 A1 | 11/2017 | Dodds et al. | |
| 2018/0265289 A1 | 9/2018 | Davis et al. | |
| 2019/0161272 A1 | 5/2019 | Betz et al. | |
| 2019/0193934 A1 | 6/2019 | Rocholl et al. | |
| 2019/0262643 A1 | 8/2019 | Shively et al. | |
| 2019/0325220 A1 | 10/2019 | Wildgrube et al. | |
| 2019/0360600 A1 | 11/2019 | Jax et al. | |
| 2020/0031641 A1 | 1/2020 | Puszkiewicz et al. | |

* cited by examiner

CARRIAGE ROLLER FOR REFUSE VEHICLE

CROSS-REFERENCE TO RELATED PATENT APPLICATIONS

This application claims the benefit of U.S. Provisional Patent Application No. 62/805,799, filed Feb. 14, 2019, which is incorporated herein by reference in its entirety.

BACKGROUND

The present invention generally relates to the field of refuse vehicles, and in particular, to a roller assembly for a loading assembly of a refuse vehicle.

SUMMARY

At least one embodiment relates to a refuse vehicle including a chassis, a plurality of tractive elements coupled to the chassis, and a lift assembly coupled to the chassis. The lift assembly includes a carriage, a grabber arm movably coupled to the carriage and selectively repositionable between an engaged position and a disengaged position, a track configured to be coupled to a chassis of the refuse vehicle, and a roller assembly slidably coupling the carriage to the track. In the engaged position, the grabber arm is configured to couple a refuse container to the carriage. The track defines a track groove extending at least partway along a length of the track. The roller assembly includes a base coupled to the carriage, a shaft coupled to the base and extending outward from the base, a roller extending at least partially into the track groove, the roller defining first a central aperture that receives the shaft, and a bushing that engages both the shaft and the roller, rotatably coupling the roller to the shaft.

Another embodiment relates to a lift assembly for a refuse vehicle including a carriage, a grabber arm movably coupled to the carriage and selectively repositionable between an engaged position and a disengaged position, a track configured to be coupled to a chassis of the refuse vehicle, and a roller assembly slidably coupling the carriage to the track. In the engaged position, the grabber arm is configured to couple a refuse container to the carriage. The track defines a track groove extending at least partway along a length of the track. The roller assembly includes a base coupled to the carriage, a shaft coupled to the base and extending outward from the base, a roller extending at least partially into the track groove, the roller defining first a central aperture that receives the shaft, and a bushing that engages both the shaft and the roller, rotatably coupling the roller to the shaft, wherein the bushing is made from a polymeric material.

Still another embodiment relates to a roller assembly configured to slidably couple a carriage to a track of a refuse vehicle. The roller assembly includes a base couple to the carriage, a shaft coupled to the base and extending outward from the base, a roller extending at least partially into the track groove, the roller defining first a central aperture that receives the shaft, and a bushing that engages both the shaft and the roller, rotatably coupling the roller to the shaft.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the Figures, a refuse truck is shown including a lift mechanism, according to an exemplary embodiment. The lift mechanism includes a grabber assembly slidably coupled to a track. The grabber assembly includes grabber arms movably coupled to a carriage and configured to be repositioned to selectively couple a refuse container (e.g., a garbage can, etc.) to the grabber assembly. The track includes a pair of track grooves that extend along a length of the track. A series of roller assemblies coupled to the carriage slidably couple the grabber assembly to the track.

Each roller assembly includes a base coupled to the carriage, a shaft extending from the base, a roller that receives the shaft, and a bushing assembly that rotatably couples the roller to the shaft. The bushing assembly includes a first washer, a second washer, a flanged bushing, and a retaining ring. The first washer extends between the base and the roller. The flanged bushing includes a main body that is pressed into a central aperture of the roller and a flange that extends radially outward from the main body. The flange extends along a side surface of the roller opposite the first washer. The retaining ring is removably inserted into a retaining ring groove defined by the shaft. A second washer extends between the flange and the retaining ring. The first washer, the second washer, and the flanged bushing are all made from one or more polymeric materials that minimize friction between the roller and the shaft. Because the bushing assembly utilizes polymeric materials, the bushing assembly does not require lubrication.

Figure 1:
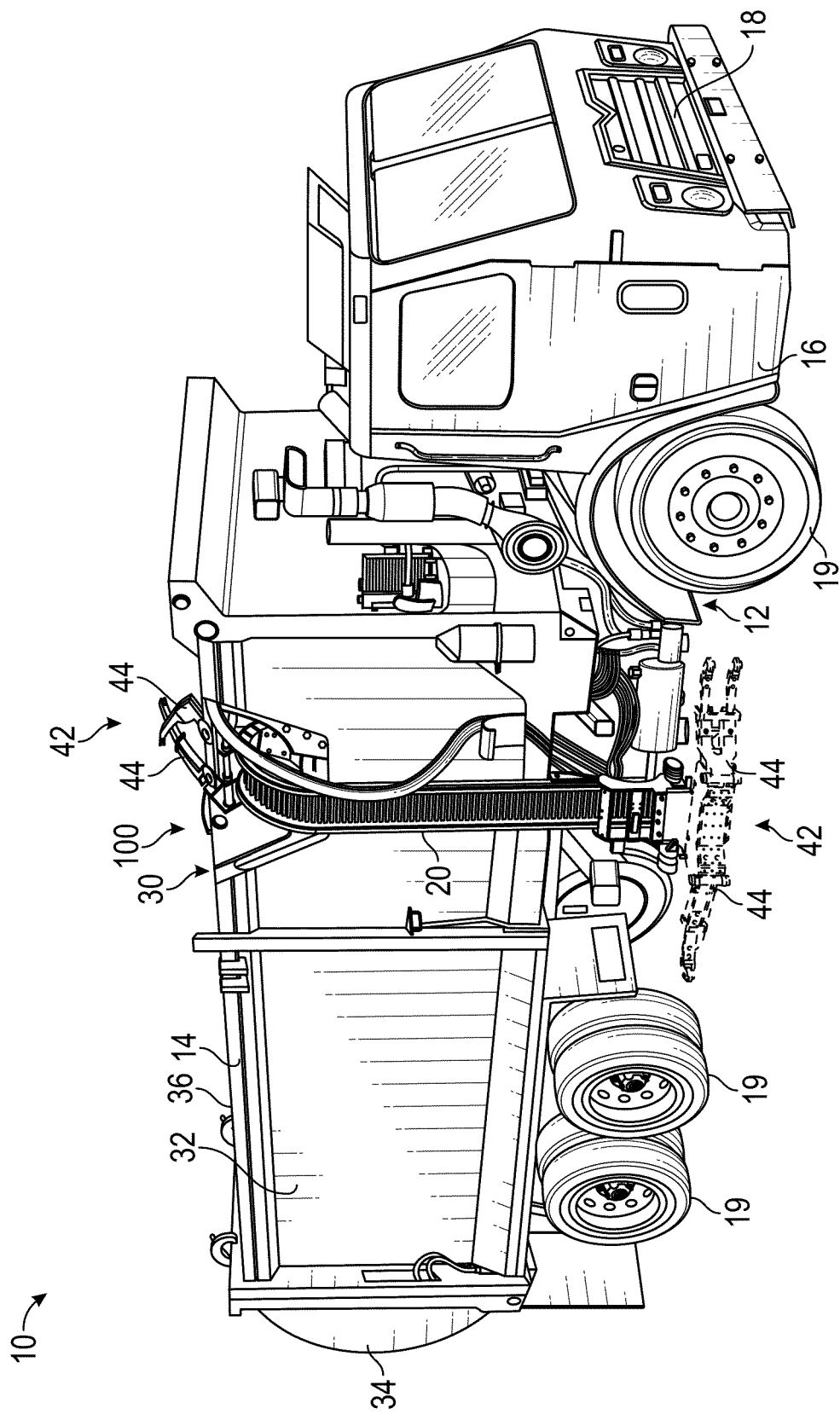
FIG. 1 is a side perspective view of a refuse vehicle including a loading assembly, according to an exemplary embodiment.

According to the exemplary embodiment shown in FIG. 1, a vehicle, shown as refuse vehicle 10 (e.g., a garbage truck, a waste collection truck, a sanitation truck, etc.), is configured as a side-loading refuse truck having a first lift mechanism/system (e.g., a side-loading lift assembly, etc.), shown as lift assembly 100. In other embodiments, the refuse vehicle 10 is configured as a front-loading refuse truck or a rear-loading refuse truck. In still other embodiments, the vehicle 10 is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, hydraulic controls, a user interface, switches, buttons, dials, etc.). As shown in FIG. 1, the refuse vehicle 10 includes a prime mover, shown as engine 18, coupled to the frame 12 at a position beneath the cab 16. The engine 18 is configured to provide power to a series of tractive elements, shown as wheels 19, and/or to other systems of the refuse vehicle 10 (e.g., a pneumatic system, a hydraulic system, etc.). The engine 18 may be configured to utilize one or more of a variety of fuels (e.g., gasoline, diesel, bio-diesel, ethanol, natural gas, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (i.e., refuse is loaded into a position of the refuse compartment 30 behind the cab 16 and stored in a position further toward the rear of the refuse compartment 30). In other embodiments, the storage volume is positioned between the hopper volume and the cab 16 (e.g., a rear-loading refuse vehicle, etc.).

As shown in FIG. 1, the refuse vehicle 10 includes the first lift mechanism/system (e.g., a front-loading lift assembly, etc.), shown as lift assembly 100. The lift assembly 100 includes a grabber assembly, shown as grabber assembly 42, slidably coupled to a guide, shown as track 20, and configured to move along an entire length of the track 20. According to the exemplary embodiment shown in FIG. 1, the track 20 extends along substantially an entire height of the body 14 and is configured to cause the grabber assembly 42 to tilt or rotate near an upper height of the body 14. In other embodiments, the track 20 extends along substantially an entire height of the body 14 on a rear side of the body 14.

Figure 2:
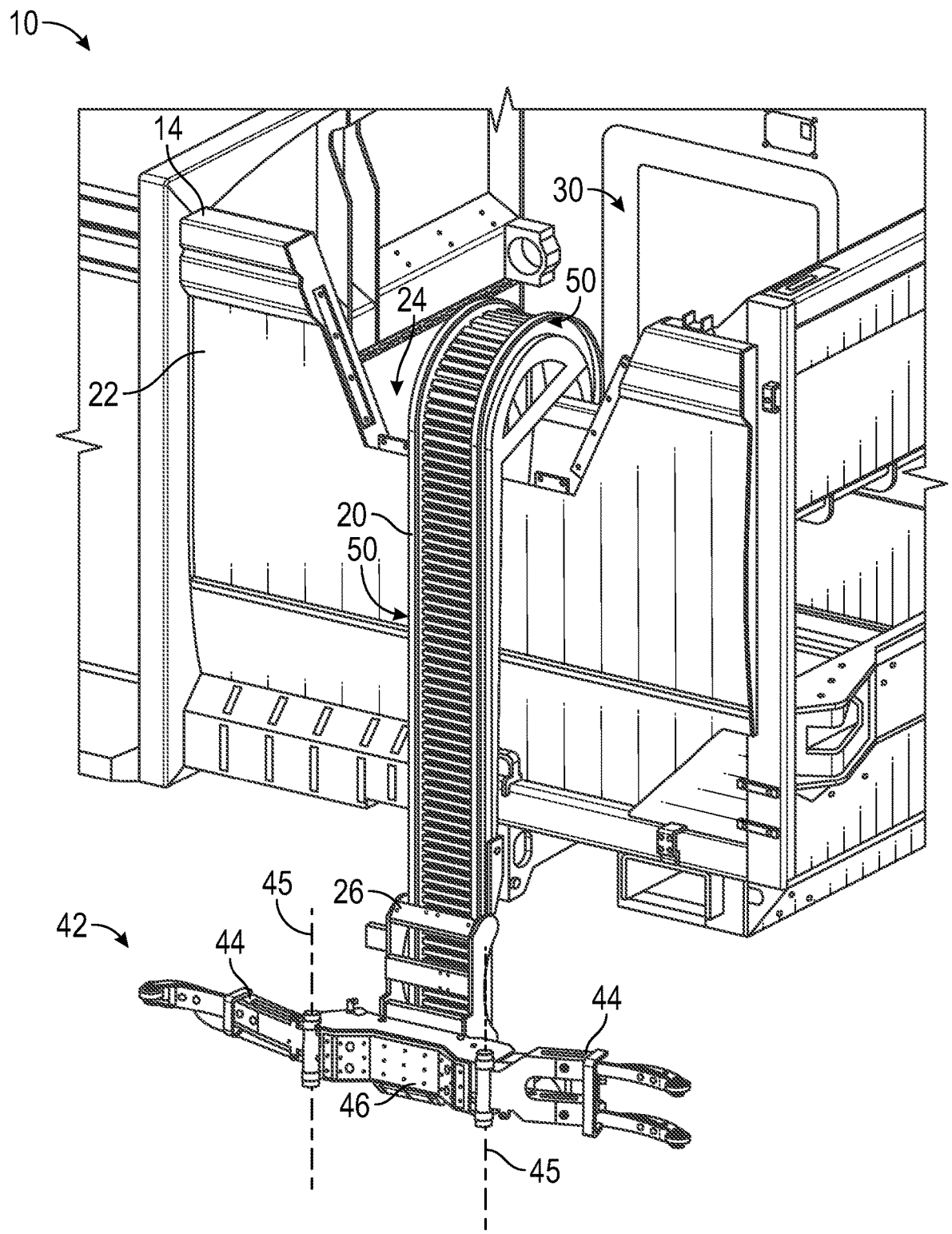
FIG. 2 is a perspective view of the loading assembly of FIG. 1.

Referring to FIGS. 1 and 2, the grabber assembly 42 includes a pair of grabber arms, shown as grabber arms 44. The grabber arms 44 are configured to releasably secure a refuse container to the grabber assembly 42, according to an exemplary embodiment. The grabber arms 44 are selectively repositionable (e.g., individually, simultaneously, etc.) between an engaged position or state and a disengaged position or state. In the engaged position, the grabber arms 44 are rotated towards one other such that the refuse container may be grasped therebetween. In the disengaged position, the grabber arms 44 rotate outwards (e.g., as shown in FIG. 2) such that the refuse container is not grasped by the grabber arms 44. By transitioning between the engaged position and the disengaged position, the grabber arms 44 releasably couple the refuse container to the grabber assembly 42. In operation, the refuse vehicle 10 may pull up alongside the refuse container, such that the refuse container is positioned to be grasped by the grabber assembly 42 therein. The grabber assembly 42 may then transition into an engaged state to grasp the refuse container. After the refuse container has been securely grasped, the grabber assembly 42 may be transported along the track 20 (e.g., by an actuator) with the refuse container. When the grabber assembly 42 reaches the end of track 20, grabber assembly 42 may tilt and empty the contents of the refuse container into the refuse compartment 30. The tilting is facilitated by the path of track 20. When the contents of the refuse container have been emptied into refuse compartment 30, the grabber assembly 42 may descend along track 20 and return the refuse container to the ground. Once the refuse container has been placed on the ground, the grabber assembly 42 may transition into the disengaged state, releasing the refuse container.

Referring now to FIG. 2, the lift assembly 100 is shown according to an exemplary embodiment. The lift assembly 100 includes the track 20 and the grabber assembly 42, which includes a frame, chassis, or connecting member, shown as carriage 26. The track 20 extends along substantially the entire height of the body 14, according to the exemplary embodiment shown. The body 14 includes a panel, shown as loading section 22, that defines a cutout or notch, shown as recess 24, through which the track 20 passes. The recess 24 facilitates a curved portion of the track 20 extending around the top of the loading section 22 without increasing the overall height of the vehicle 10. When the grabber assembly 42 moves along the curved portion of the track 20, the grabber assembly 42 is inverted to empty the refuse container releasably coupled to the grabber assembly 42 into the refuse compartment 30.

The carriage 26 is slidably coupled to the track 20. In operation, the carriage 26 may translate along a portion or all of the length of the track 20. The carriage 26 is removably coupled (e.g., by removable fasteners) to a body or frame of the grabber assembly 42, shown as grabber frame 46. Alternatively, the grabber frame 46 may be fixedly coupled to (e.g., welded to, integrally formed with, etc.) the carriage 26. The grabber arms 44 are each pivotally coupled to the grabber frame 46 such that they rotate about a pair of axes 45. The axes 45 extend substantially parallel to one another and are longitudinally offset from one another. In some embodiments, one or more actuators configured to rotate the grabber arms 44 between the engaged state and the disengaged state are coupled to the grabber frame 46 and/or the carriage 26.

Figure 3:
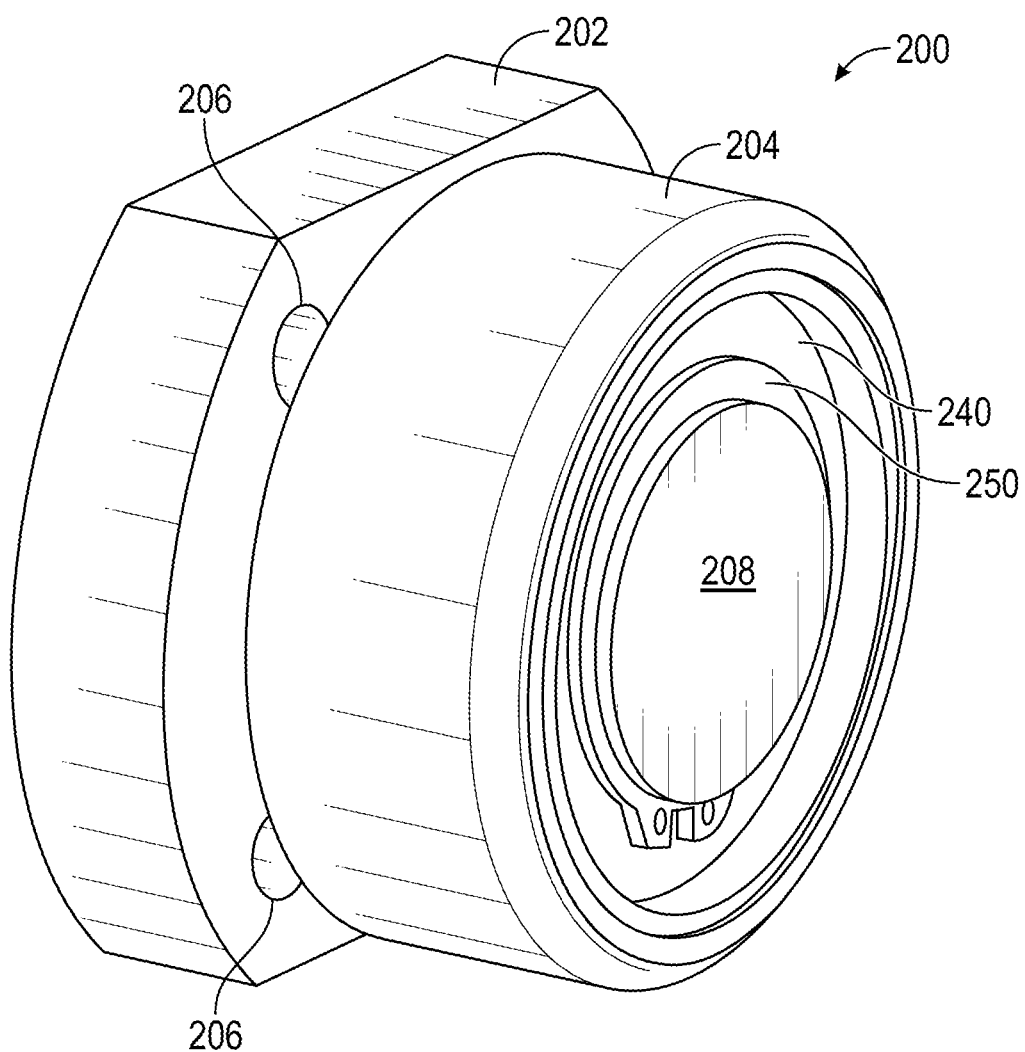
FIG. 3 is a perspective view of a roller assembly of the loading assembly of FIG. 1.
Figure 4:
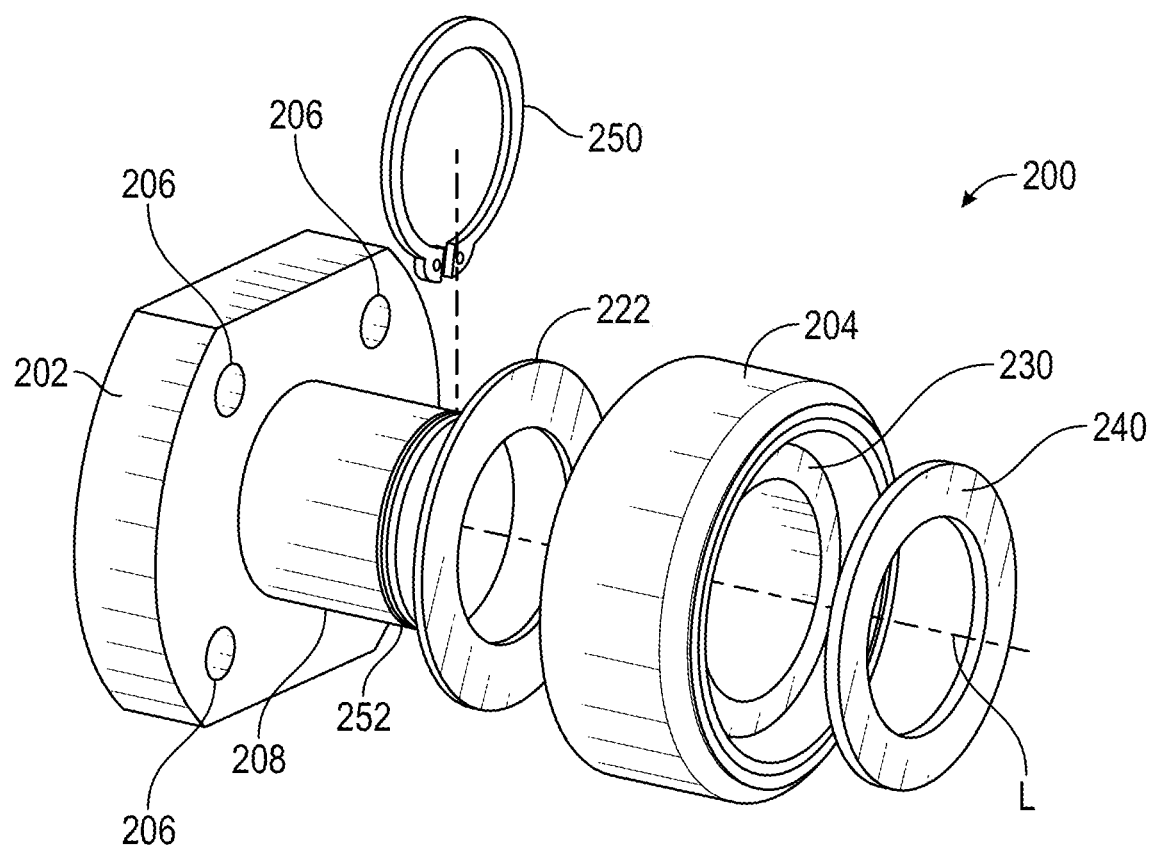
FIG. 4 is an exploded perspective view of the roller assembly of FIG. 3.
Figure 5:
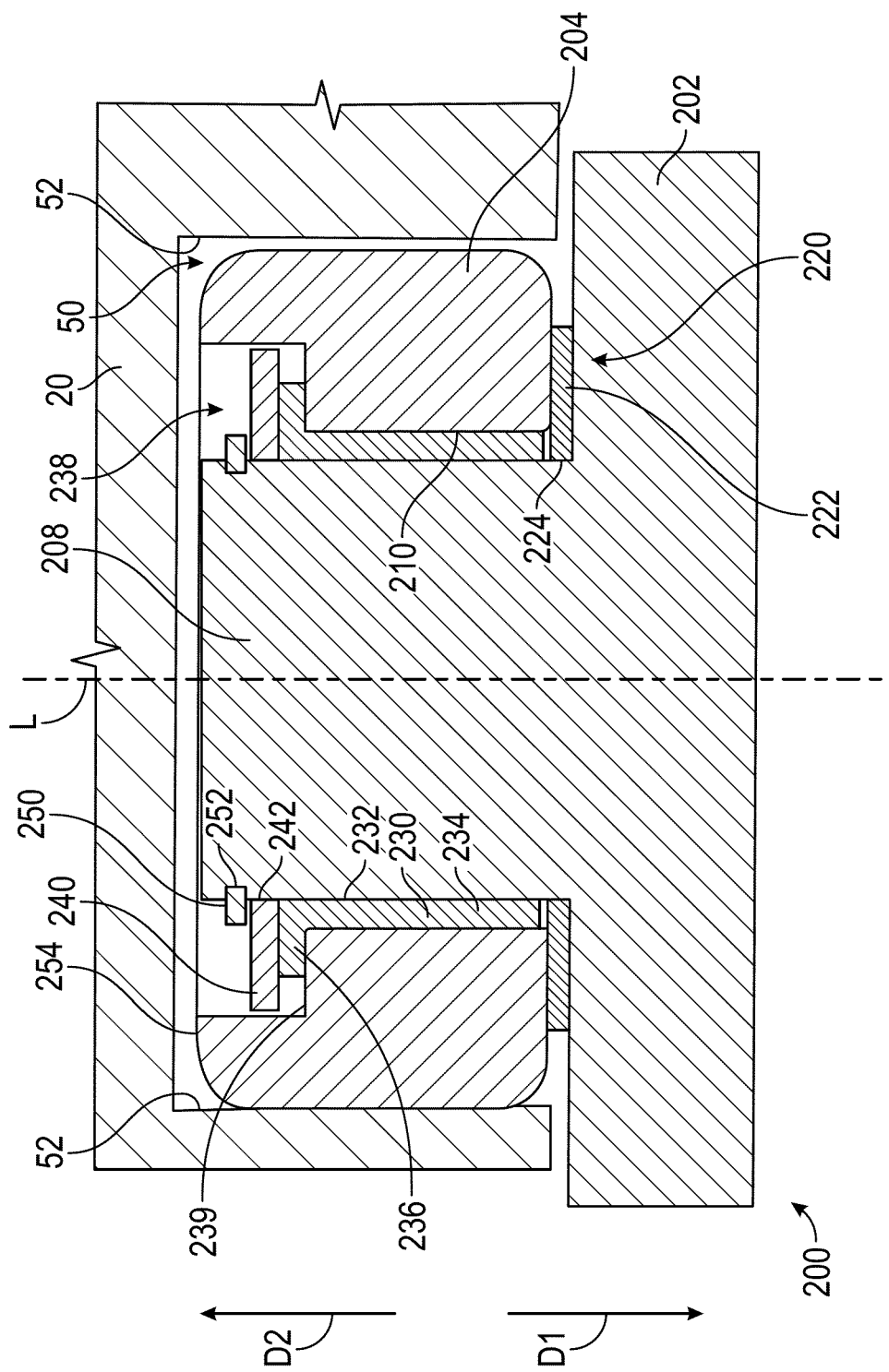
FIG. 5 is a side section view of the roller assembly of FIG. 3 and a track of the loading assembly of FIG. 1.

Referring to FIGS. 3-5, the lift assembly 100 includes a series of carriage roller assemblies, shown as roller assemblies 200. The roller assemblies 200 are configured to slidably couple the carriage 26 to the track 20. Each roller assembly 200 includes a main body, base member, or frame, shown as base 202, that is rotatably coupled to a wheel or caster, shown as roller 204. The base 202 is coupled to the carriage 26. As shown in FIGS. 3 and 4, the base 202 defines a series of apertures, shown as fastener apertures 206. The fastener apertures 206 facilitate insertion of fasteners to couple the base 202 to the carriage 26. In one embodiment, the fastener apertures 206 are threaded. The base 202 further includes a cylindrical projection, protrusion, or post, shown as shaft 208. The shaft 208 extends (e.g., partially, completely) through a central aperture 210 defined by the roller 204 to rotatably couple the roller 204 to the base 202.

Referring to FIGS. 2 and 5, the track 20 defines a pair of slots, grooves, or recesses, shown as track grooves 50, on opposite longitudinal sides of the track 20. The track grooves 50 each extend along the length of the track 20 (e.g., along the entire length, along a portion of the length, etc.). Each track groove 50 is defined between two engagement surfaces, shown in FIG. 5 as side walls 52. Each roller 204 is received within one of the track grooves 50. In the embodiment shown in FIG. 2, the track grooves 50 open longitudinally outward from the center of the track 20. Accordingly, the roller assemblies 200 extend longitudinally inward from the carriage 26 into the track grooves 50. The rollers 204 engage the side walls 52, limiting movement of the roller assemblies 200 perpendicular to the length of the track 20. When a force is applied to the carriage 26 along the length of the track 20, the rollers 204 spin freely, permitting free motion of the carriage 26 along the length of the track 20. As shown in FIG. 5, the widths of the track grooves 50 may be greater than the diameters of the rollers 204 to permit the rollers 204 to rotate freely.

In one embodiment, the lift assembly 100 includes four of the roller assemblies 200. Specifically, two of the rollers 204 enter into each of the track grooves 50. The roller assemblies 200 may be coaxially aligned with one another (e.g., a top pair of the rollers 204 in opposing track grooves 50 are aligned, and a bottom pair of the rollers 204 in opposing track grooves 50 are aligned, etc.). In this embodiment, the roller assemblies 200 constrain the position and orientation of the grabber assembly 42 relative to the track 20. By way of example, near the bottom of the track 20, the track grooves 50 are substantially vertical, and the roller assemblies 200 hold the carriage 26 substantially vertical. As the roller assemblies 200 reach the top of the track 20, the track grooves 50 curve, and the relative vertical positions of the roller assemblies 200 change, causing the grabber assembly 42 to rotate about a longitudinal axis. As the roller assemblies 200 extend around the curve, the roller assemblies 200 cause the grabber assembly 42 to invert. Accordingly, the roller assemblies 200 constrain the motion of the grabber assembly 42 such that the orientation of the grabber assembly 42 can be varied solely by moving it along the length of the track 20. In an alternative embodiment, the lift assembly 100 includes two of the roller assemblies 200, each in a different one of the track grooves 50. In this embodiment, the orientation of the grabber assembly 42 is otherwise controlled (e.g., by gravity holding the grabber assembly 42 against the track 20, by another roller positioned within another track groove, etc.).

Figure 6:
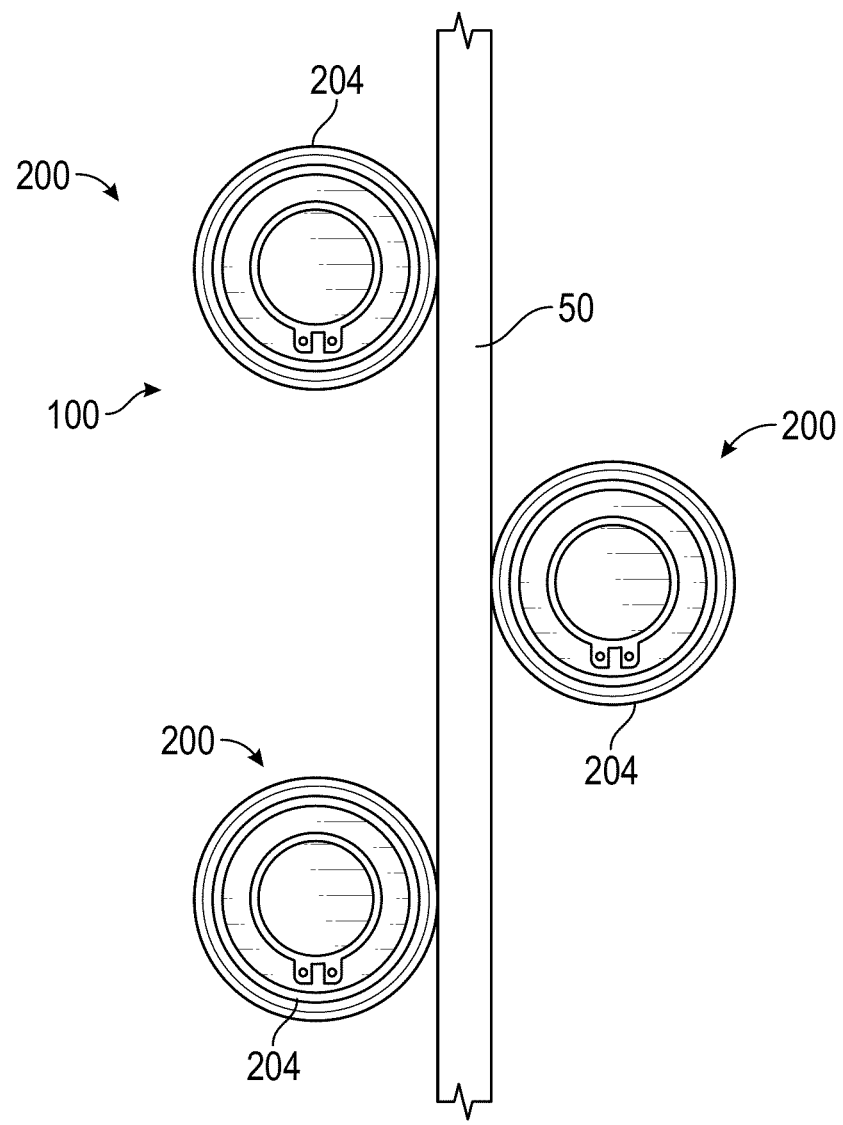
FIG. 6 is a side view of a lift assembly of a refuse vehicle, according to an exemplary embodiment.

In other embodiments, the track grooves 50 are omitted (e.g., the track 50 is solid), and the rollers 204 engage an external surface of the track 50 to constrain the grabber assembly 42 relative to the track 20. Referring to FIG. 6, three rollers 204 are arranged within a single plane (e.g., the plane of the page of FIG. 6). Two rollers 204 engage the track 50 on one side and one other roller 204 engages the track 50 on an opposing side. The third roller 204 is positioned between the first two rollers, limiting movement of the rollers 204, and thus the grabber assembly 42, perpendicular to the track 50. The rollers 204 permit the grabber assembly 42 to travel freely along the length of the track 50. In other embodiments, more or fewer rollers 204 engage the track 50.

Figure 7:
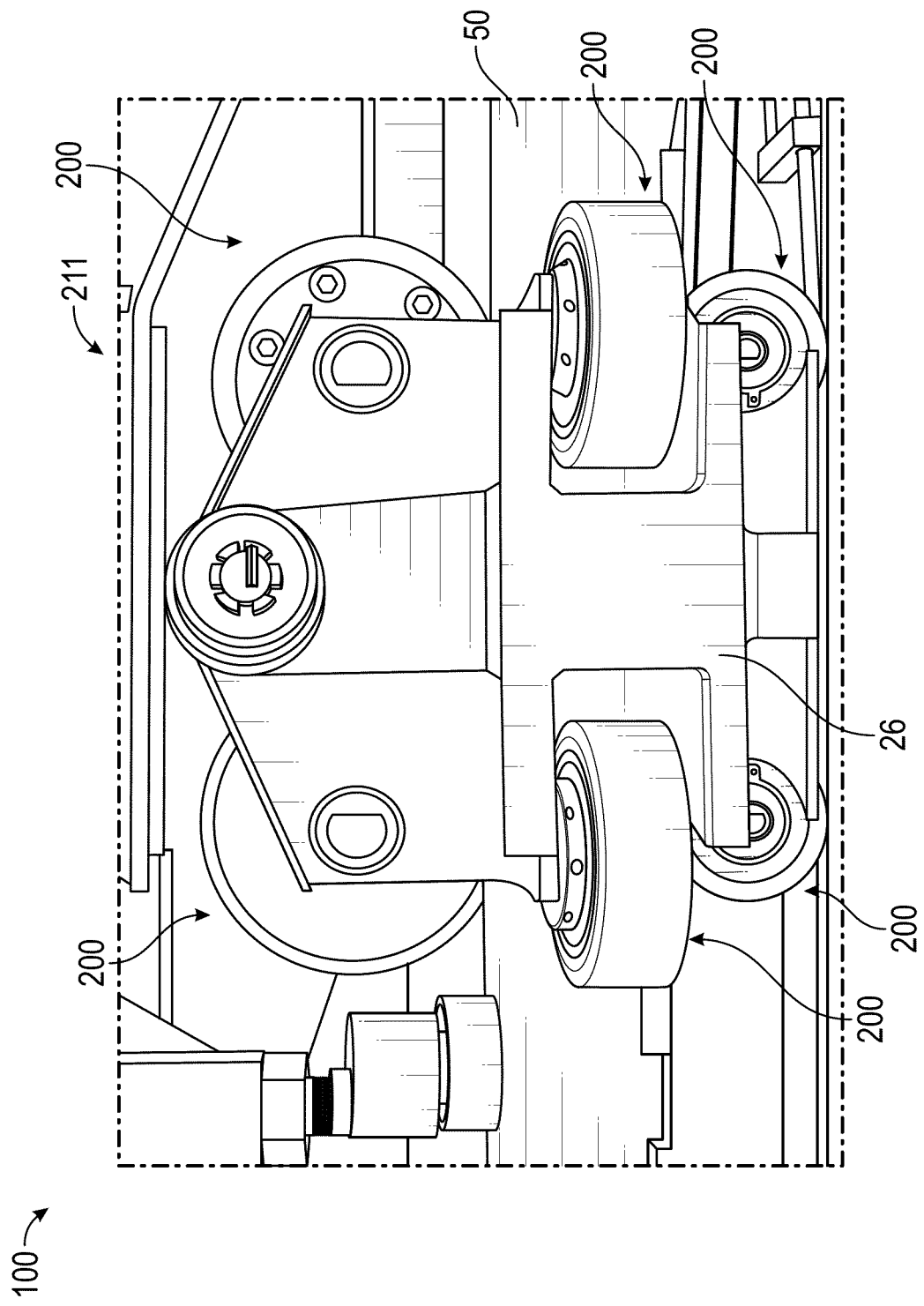
FIG. 7 is a side perspective view of a lift assembly of a refuse vehicle, according to an exemplary embodiment.
Figure 8:
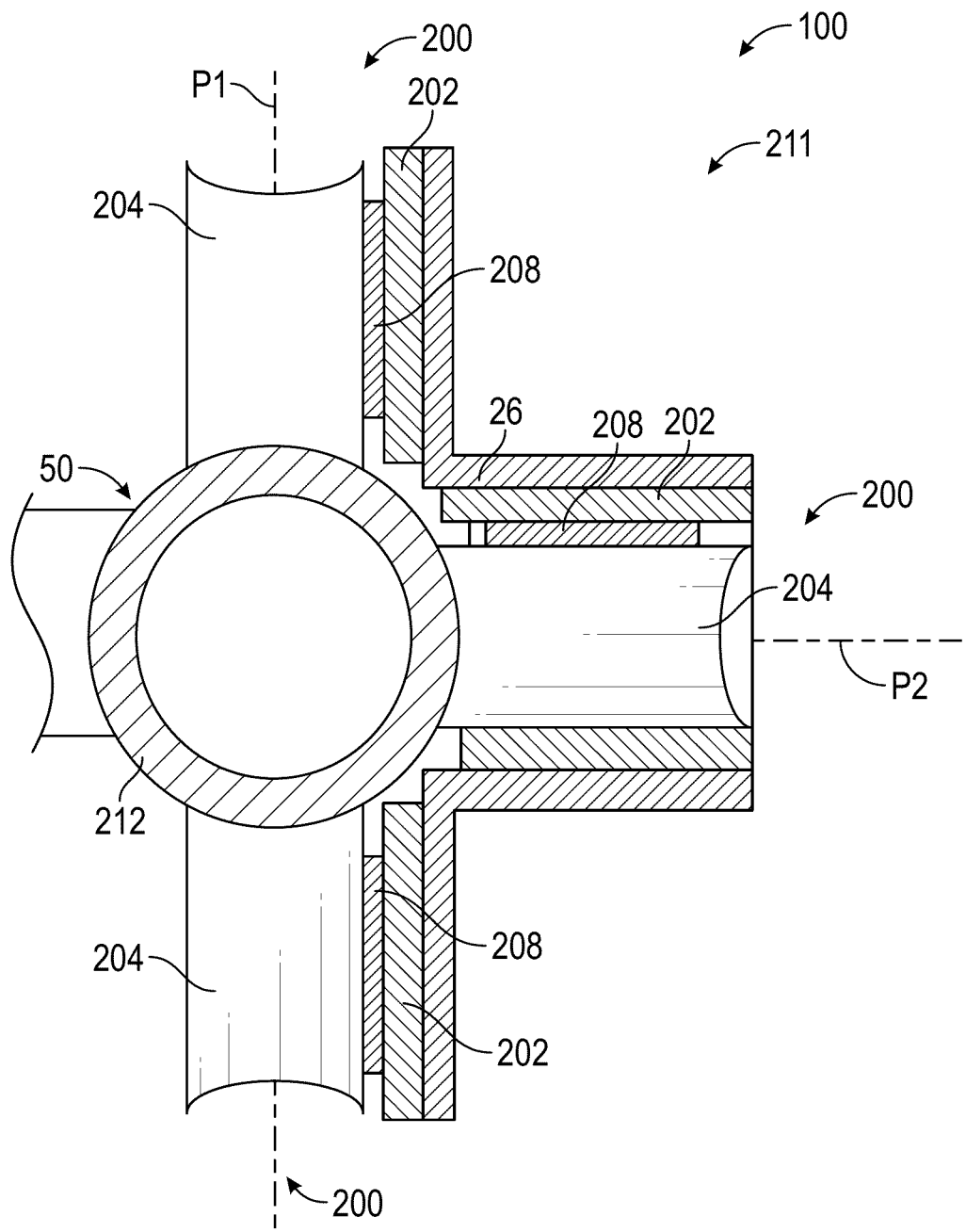
FIG. 8 is a top section view of the lift assembly of FIG. 7.

Referring to FIGS. 7 and 8, the grabber assembly 42 includes an assembly, shown as carriage arrangement 211, having rollers 204 that engage the track 50 in multiple planes. As shown, the track 50 includes a tube 212 having a circular cross section. The carriage arrangement 211 includes six roller assemblies 200 coupled to the carriage 26. Four of the rollers 204 engage the tube 212 along a first plane $P_1$, and two of the roller 204 engage the tube 212 along a second plane $P_2$. The first plane $P_1$ is substantially perpendicular to the second plane $P_2$. Of the rollers 204 that are positioned within the first plane $P_1$, two of the rollers 204 engage a first side of the tube 212, and two of the rollers 204 engage a second side of the tube 212 opposite the first side. To facilitate engagement of the surfaces of rollers 204 with the tube 212, the rollers 204 have a circular curvature having the same radius as the tube 212.

The rollers 204 in the first plane $P_1$ limit movement of the carriage 26 perpendicular to the tube 212 in the first plane $P_1$. The rollers 204 in the second plane $P_2$ limit movement of the carriage 26 in a first direction perpendicular to the tube 212 (e.g., toward the tube 212) in the second plane $P_2$. In some embodiments, the curvature of the rollers 204 limits movement of the carriage 26 in a second direction perpendicular to the tube 212 (e.g., away from the tube 212) in the second plane $P_2$. In some embodiments, the track 50 includes two tubes 212, and the grabber assembly 42 includes two of the carriage arrangements 211, each carriage arrangement 211 receiving one of the tubes 212. In such an embodiment, the carriage arrangements 211 may face opposite directions to limit movement of the grabber assembly 42 relative to the track 50 in all directions except along the length of the track 50. In other embodiments, the rollers 204 are arranged along three different planes (e.g., each plane offset 120 degrees from one another, etc.) to limit (e.g., prevent) movement of the grabber assembly 42 perpendicular to the track 50. In other embodiments, the carriage arrangement 211 includes more or fewer rollers 204.

Referring to FIGS. 3-5, a bushing assembly 220 rotatably couples the roller 204 to the shaft 208. The bushing assembly 220 includes a first thrust washer, bushing, or spacer, shown as washer 222. The washer 222 defines a central aperture, shown as aperture 224, that extends through the center of the washer 222 and receives the shaft 208. The washer 222 is positioned between the roller 204 and the base 202 such that the washer 222 engages and is compressed between side surfaces of the roller 204 and the base 202 when a force is applied to the roller 204 in a longitudinal direction $D_1$. Accordingly, the washer 222 limits movement of the roller 204 in the longitudinal direction $D_1$.

The bushing assembly 220 further includes a bushing or spacer, shown as flanged bushing 230. The flanged bushing 230 is offset in a second longitudinal direction $D_2$ opposite the first longitudinal direction $D_1$ from the washer 222. The flanged bushing 230 defines a central aperture, shown as aperture 232, that extends through the center of the flanged bushing 230 and receives the shaft 208. The flanged bushing 230 includes a first portion, shown as main body 234, and a second portion, shown as flange 236, extending radially outward from the main body 234. The main body 234 defines an outer diameter of the flanged bushing 230 and is received within the central aperture 210. In some embodiments, the main body 234 is sized as a press fit with the central aperture 210, coupling the flanged bushing 230 to the roller 204. The roller 204 further defines a recess, shown as counterbore 238, that extends into the roller 204 in the first longitudinal direction $D_1$. The counterbore 238 receives the flange 236. The flange 236 engages a side surface, shown as outer surface 239, of the roller 204, limiting lateral movement of the flanged bushing 230 in the first longitudinal direction $D_1$ relative to the roller 204. In some embodiments, the washer 222 engages the roller 204 and/or the flanged bushing 230 (e.g., the main body 234).

The bushing assembly 220 includes a second thrust washer, bushing, or spacer, shown as washer 240. The washer 240 defines a central aperture, shown as aperture 242, that extends through the center of the washer 240 and receives the shaft 208. The washer 240 is positioned longitudinally outward from the flange 236 in the second longitudinal direction $D_2$ and engages the flange 236. The aperture 224 and the aperture 242 may be substantially the same diameter.

The bushing assembly 220 further includes a retainer or retaining ring, shown as snap ring 250. The shaft 208 defines a radial groove or slot, shown as retaining ring groove or snap ring groove 252, that receives the snap ring 250. Once inserted into the snap ring groove 252, the snap ring 250 is held in place longitudinally (e.g., held in a fixed longitudinal position, held within a limited range of longitudinal positions, etc.). The snap ring 250 engages an outer surface of the washer 240. When a longitudinal force is applied to the roller 204 in the second longitudinal direction $D_2$, the roller 204 engages the flange 236, the flange 236 engages the washer 240, and the washer 240 engages the snap ring 250, limiting longitudinal movement of the roller 204 in the second longitudinal direction $D_2$. The snap ring groove 252 is longitudinally positioned such that bushing assembly 220 limits the overall longitudinal movement of the roller 204, the washer 222, the flanged bushing 230, and the washer 240.

Once the bushing assembly 220 is assembled, the roller 204, the shaft 208, the washer 222, the flanged bushing 230, the washer 240, and the snap ring 250 are substantially centered about a longitudinal axis L. The roller 204, the washer 222, the flanged bushing 230, and the washer 240 may be rotatable relative to the shaft 208 about the longitudinal axis L. The counterbore 238 receives the flange 236, the washer 240, the snap ring 250, and the distal end of the shaft 208. Because the counterbore 238 receives these components, the end of the shaft 208 is positioned completely inward of an outer surface 254 of the roller 204 (e.g., the flat side of the roller 204 that is closest to the track 20). This reduces the overall width of the roller assembly 200 and prevents the shaft 208 from dragging across a surface of the track 20, which could otherwise cause additional friction and wear.

In an alternative embodiment, the flanged bushing 230 is inverted such that the flange 236 extends directly between the base 202 and the roller 204. In such embodiments, the washer 240 may engage the outer surface 239 of the roller 204 and/or the main body 234 of the flanged bushing 230. The flange 236 may engage the washer 222. Alternatively, the washer 222 may be omitted and the flange 236 may engage the base 202.

In another alternative embodiment, the flanged bushing 230 is replaced with a bushing that omits the flange 236. In such an embodiment, the washer 240 may engage the outer surface 239. In another alternative embodiment, the washer 240 is omitted, and the snap ring 250 engages the flange 236.

In some embodiments, the washer 222, the flanged bushing 230, and/or the washer 240 are made from polymeric material(s). The polymeric material of each component may have a relatively low coefficient of friction with the adjacent components such that friction within the roller assembly 200 is minimized. By way of example, the polymeric material of the flanged bushing 230 may have a low coefficient of friction with the material of the shaft 208 (e.g., steel, aluminum, etc.). This low coefficient of friction may be inherent to the polymeric material such that no additional lubricants are required by or used with the bushing assembly 220. In other bearing arrangements, greased roller bearings are used to rotatably couple a roller to a shaft. These roller bearings may require frequent applications of lubricant to prevent an increase in friction over time. Because the bushing assembly 220 does not require the addition of lubricant, the roller assembly 200 requires less maintenance than other roller assemblies, lowering the operational cost of the vehicle 10.

The polymeric materials of the washer 222, the flanged bushing 230, and the washer 240 may be selected such that the washer 222, the flanged bushing 230, and the washer 240 act as wear items that wear instead of or at a faster rate than other components of the roller assembly 200. By way of example, the flanged bushing 230 may rotate relative to the shaft 208. The flanged bushing 230 may be made from a material softer than that of the shaft 208 such that when wear occurs between the flanged bushing 230, the flanged bushing 230 experiences most or all of the wear. The washer 222, the flanged bushing 230, and the washer 240 may be cost effective and easy to replace. By way of example, these components may be made quickly and easily through injection molding. Additionally, polymeric materials may be more cost effective than other materials used in bearing arrangements, such as steel. Once the bushing assembly 220 has worn sufficiently to warrant replacement, the snap ring 250 may be removed, and the roller assembly 200 may be disassembled. The flanged bushing 230 may be pressed out of the roller 204. A new flanged bushing 230 may be pressed into the roller 204, and the roller assembly 200 may be reassembled (e.g., with a new washer 222 and/or a new washer 240).

In other roller assemblies that utilize greased roller bearings, if lubricant is not routinely added, the roller bearings may seize. If the roller bearings seize, the rollers may slide instead of roll along the corresponding tracks. This may cause wear that results in flat spots on the exterior of the roller. Such roller assemblies are more costly to replace than the roller assembly 200. Additionally, in other roller assemblies, there is potential to add too much lubricant to the roller bearings, wasting lubricant and increasing friction within the roller assembly. Selecting the ideal amount of lubricant to add to the roller assembly requires some skill. Because the roller assembly 200 does not require lubricant, the roller assembly 200 can be installed by an operation without this skillset.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A refuse vehicle comprising:
a chassis;
a plurality of tractive elements coupled to the chassis; and
a lift assembly coupled to the chassis comprising:
   a carriage;
   a grabber arm movably coupled to the carriage and configured to couple a refuse container to the carriage;
   a track coupled to the chassis, the track defining a track groove extending at least partway along a length of the track; and
   a roller assembly slidably coupling the carriage to the track, the roller assembly comprising:
      a base coupled to the carriage;
      a shaft coupled to the base and extending outward from the base;
      a roller extending at least partially into the track groove, the roller defining first a central aperture that receives the shaft;
      a bushing that engages the shaft and rotatably couples the roller to the shaft, the bushing including a main body that extends directly between the roller and the shaft and a flange that extends radially outward from the main body, wherein the flange engages a side surface of the roller;
      a first washer defining a second central aperture that receives the shaft, wherein the first washer engages at least one of the roller and the bushing; and
      a second washer defining a third central aperture that receives the shaft, wherein the second washer engages the flange of the bushing.

2. The refuse vehicle of claim 1, wherein the first washer engages the base and the roller.

3. The refuse vehicle of claim 2, wherein the shaft defines a retaining ring groove extending around a circumference of the shaft, wherein the roller assembly further includes a retaining ring that extends into the retaining ring groove, and wherein the first washer, the roller, the bushing, and the second washer are all positioned directly between the base and the retaining ring.

4. The refuse vehicle of claim 3, wherein at least one of the first washer, the second washer, and the bushing are made from a polymeric material.

5. The refuse vehicle of claim 4, wherein the first washer, the second washer, and the bushing are all made from at least one polymeric material.

6. The refuse vehicle of claim 5, wherein the polymeric material of the bushing is configured to wear at a faster rate than the shaft when the roller rotates about the shaft.

7. A lift assembly for a refuse vehicle, comprising:
a carriage;
a grabber arm movably coupled to the carriage and configured to couple a refuse container to the carriage;
a track configured to be coupled to a chassis of the refuse vehicle, the track defining a track groove extending at least partway along a length of the track; and
a roller assembly slidably coupling the carriage to the track, the roller assembly comprising:
   a base coupled to the carriage;
   a shaft coupled to the base and extending outward from the base, the shaft defining a retaining ring groove extending around a circumference of the shaft;
   a roller extending at least partially into the track groove, the roller defining first a central aperture that receives the shaft;

a bushing that engages both the shaft and the roller, rotatably coupling the roller to the shaft; and a retaining ring that extends into the retaining ring groove, wherein the roller and the bushing are positioned directly between the base and the retaining ring, and wherein the bushing is made from a polymeric material.

8. The lift assembly of claim 7, wherein the roller assembly further comprises a first washer defining a second central aperture that receives the shaft, wherein the first washer is configured to engage at least one of the roller and the bushing.

9. The lift assembly of claim 8, wherein the bushing includes a main body that extends directly between the roller and the shaft and a flange that extends radially outward from the main body, wherein the flange engages a side surface of the roller, and wherein the first washer engages the base and the roller.

10. The lift assembly of claim 8, wherein the roller assembly further comprises a second washer defining a third central aperture that receives the shaft, wherein the second washer engages a flange of the bushing.

11. The lift assembly of claim 10, wherein at least one of the first washer and the second washer are made from at least one polymeric material.

12. The lift assembly of claim 7, wherein the polymeric material of the bushing is configured to wear at a faster rate than the shaft when the roller rotates about the shaft.

13. A roller assembly configured to slidably couple a carriage to a track of a refuse vehicle, the roller assembly comprising:
   a base coupled to the carriage;
   a shaft coupled to the base and extending outward from the base;
   a roller extending at least partially into a track groove of the track, the roller defining first a central aperture that receives the shaft;
   a bushing that engages the shaft and rotatably couples the roller to the shaft, the bushing including a main body that extends directly between the roller and the shaft and a flange that extends radially outward from the main body, wherein the flange engages a side surface of the roller;
   a first washer defining a second central aperture that receives the shaft, wherein the first washer is configured to engage at least one of the roller and the bushing; and a second washer defining a third central aperture that receives the shaft, wherein the second washer engages the flange of the bushing.

14. The roller assembly of claim 13, wherein the bushing is made from a polymeric material, and wherein the polymeric material of the bushing is configured to wear at a faster rate than the shaft when the roller rotates about the shaft.

15. A lift assembly for a refuse vehicle, comprising:
   a carriage;
   a grabber arm movably coupled to the carriage and configured to couple a refuse container to the carriage;
   a track configured to be coupled to a chassis of the refuse vehicle, the track defining a track groove extending at least partway along a length of the track; and
   a roller assembly slidably coupling the carriage to the track, the roller assembly comprising:
      a base coupled to the carriage;
      a shaft coupled to the base and extending outward from the base;
      a roller extending at least partially into the track groove, the roller defining a first aperture that receives the shaft;
      a bushing that engages both the shaft and the roller, rotatably coupling the roller to the shaft;
      a first washer defining a second aperture that receives the shaft, wherein the first washer is configured to engage at least one of the roller and the bushing; and
      a second washer defining a third aperture that receives the shaft, wherein the second washer engages a flange of the bushing, wherein the bushing is made from a polymeric material.

16. The lift assembly of claim 15, wherein the bushing includes a main body that extends directly between the roller and the shaft and the flange that extends radially outward from the main body, wherein the flange engages a side surface of the roller, and wherein the first washer engages the base and the roller.

17. The lift assembly of claim 15, wherein at least one of the first washer and the second washer are made from at least one polymeric material.

18. The lift assembly of claim 15, wherein the polymeric material of the bushing is configured to wear at a faster rate than the shaft when the roller rotates about the shaft.

* * * * *